United States Patent
Ohki et al.

(10) Patent No.: US 6,471,766 B2
(45) Date of Patent: Oct. 29, 2002

(54) PIGMENT DISPERSANTS AND PIGMENT COMPOSITIONS CONTAINING THE SAME

(75) Inventors: Shigeru Ohki, Tokyo (JP); Takayuki Soga, Tokyo (JP); Kazutaka Aoki, Tokyo (JP); Shotoku Takami, Tokyo (JP); Hisao Okamoto, Tokyo (JP); Hiroaki Saikatsu, Tokyo (JP); Shirou Yamamiya, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 12 days.

(21) Appl. No.: 09/759,330

(22) Filed: Jan. 16, 2001

(65) Prior Publication Data

US 2001/0013303 A1 Aug. 16, 2001

(30) Foreign Application Priority Data

Jan. 20, 2000 (JP) ......................... 2000-014213

(51) Int. Cl.[7] ................. C09B 67/00; C09B 67/46; B01F 17/32; C08K 5/00; G03F 7/004
(52) U.S. Cl. ............... 106/498; 106/493; 106/494; 430/7; 430/322; 524/100; 544/187; 544/188
(58) Field of Search ................. 106/493, 494, 106/498; 430/7, 322; 544/187, 188; 524/100

(56) References Cited

U.S. PATENT DOCUMENTS

| | | | |
|---|---|---|---|
| 5,814,434 A | 9/1998 | Nakamura et al. | 430/25 |
| 5,913,972 A | 6/1999 | Kanou et al. | 106/31.87 |
| 5,961,711 A | * 10/1999 | Saikatsu et al. | 106/498 |
| 6,299,676 B1 | * 10/2001 | Saikatsu et al. | 106/31.77 |
| 6,302,953 B1 | * 10/2001 | Saikatsu et al. | 106/498 |

FOREIGN PATENT DOCUMENTS

JP 11-189732 * 7/1999

* cited by examiner

Primary Examiner—Anthony J. Green
(74) Attorney, Agent, or Firm—Oblon, Spivak, McClelland, Maier & Neustadt, P.C.

(57) ABSTRACT

Pigment dispersants comprise compounds represented by the following formula (I) or (II) or metal, ammonium or amine salts thereof:

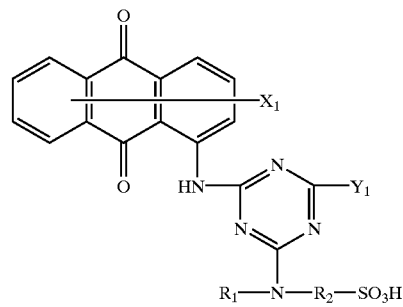

(I)

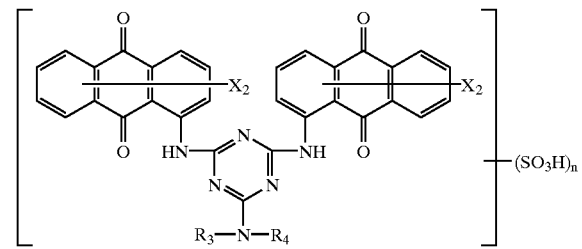

(II)

wherein $X_1$ is a hydrogen or halogen atom or an alkyl or acylamino group, $Y_1$ is an anthraquinonylamino, phenylamino, naphthyl-amino or phenoxy group, each of $R_1$ and $R_3$ is a hydrogen atom or a substituted or unsubstituted alkyl or phenyl group, $R_2$ is a substituted or unsubstituted alkylene, phenylene or naphthylene group, $X_2$ is a hydrogen or halogen atom or a substituted or unsubstituted alkyl group, $R_4$ is a substituted or unsubstituted phenyl or naphthyl group, and n means an average number of sulfonic acid groups introduced in said compound and stands for a number of from 0.5 to 2. Pigment compositions, such as colorants for gravure inks, paints or color filters, comprise pigments and the pigment dispersants.

17 Claims, No Drawings

PIGMENT DISPERSANTS AND PIGMENT COMPOSITIONS CONTAINING THE SAME

BACKGROUND OF THE INVENTION a) Field of the invention

This invention relates to pigment dipersants and pigment compositions using the same.

b) Detailed Description of the Related Art

Upon mixing and dispersing a pigment in a vehicle such as a paint, gravure ink or offset ink, difficulty is generally encountered in stably dispersing the pigment in the vehicle. Fine particles of the pigment, which have once been dispersed in the vehicle, tend to flocculate in the vehicle. This leads to an increase in the viscosity of the vehicle with the pigment dispersed therein, a reduction in the coloring power of an ink or paint making use of the vehicle with the pigment dispersed therein, a reduction in the gloss of a coating of the ink or paint, or the like.

SUMMARY OF THE INVENTION

An object of the present invention is, therefore, to provide a pigment dispersant, which upon production of printing inks (offset inks, gravure inks and the like), various paints, plastics, pigment-type textile printing agents, dry or wet toners for electrophotography, inks for ink-jet recording, inks for thermal transfer recording, inks for writing instruments, colorants for color filters, and the like, prevents flocculation of dispersed pigment particles and permits the production of these inks and the like with excellent flow property and high stability.

In one aspect of the present invention, there is accordingly provided a pigment dispersant (hereinafter simply called "dispersant"), which comprises a compound represented by the following formula (I) or (II) or a metal, ammonium or amine salt thereof:

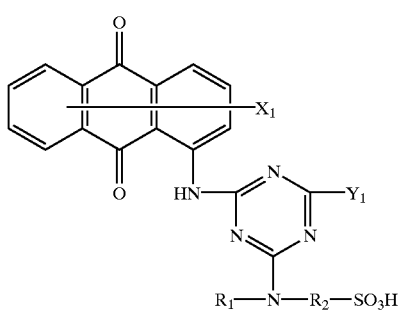

(I)

wherein $X_i$ is a hydrogen atom, a halogen atom, or an alkyl or acylamino group which may be unsubstituted or substituted by at least one atom or group selected from the group consisting of halogen atoms, alkyl groups and an acylamino group, $Y_1$ is an anthraquinonylamino, phenylamino, naphthylamino or phenoxy group which may be unsubstituted or substituted by at least one atom or group selected from the group consisting of halogen atoms, alkyl groups and an acylamino group, $R_1$ is a hydrogen atom or a substituted or unsubstituted alkyl or phenyl group, and $R_2$ is a substituted or unsubstituted alkylene, phenylene or naphthylene group; or

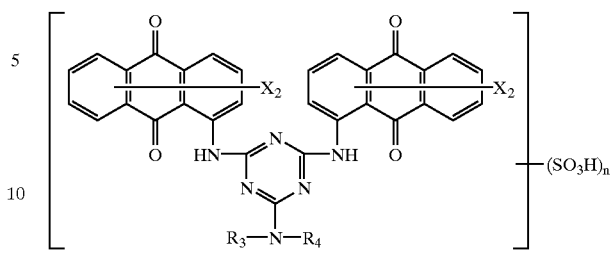

(II)

wherein $X_2$ is a hydrogen atom, a halogen atom, or a substituted or unsubstituted alkyl group, $R_3$ is a hydrogen atom or a substituted or unsubstituted alkyl or phenyl group, $R_4$ is a substituted or unsubstituted phenyl or naphthyl group, and n means an average number of sulfonic acid groups introduced in said compound and stands for a number of from 0.5 to 2.

In another aspect of the present invention, there is also provided a pigment composition, for example, a colorant for gravure inks, paints or color filters, which comprises a pigment and the above-described dispersant.

The dispersant of the present invention is useful for dispersing various pigments, which include organic pigments and inorganic pigments, in vehicles for a variety of applications such as printing inks (offset inks, gravure inks and the like), various paints, plastics, pigment-type textile printing agents, dry or wet toners for electrophotography, inks for ink-jet recording, inks for thermal transfer recording, inks for writing instruments and inks for color filters. The dispersant of the present invention can significantly improve the flow property of inks, paints and the like, can prevent flocculation of pigment particles, and hence, can provide colored articles which show excellent gloss and vividness.

DETAILED DESCRIPTION OF THE INVENTION AND PREFERRED EMBODIMENTS

The dispersant according to the present invention features in the inclusion of a yellow to reddish purple anthraquinonylaminotriazine structure in its structure. It has excellent compatibility with various pigments, and is usable for dispersing a variety of pigments. Owing to its excellent pigment dispersing effect, the dispersant according to the present invention can also be used for the production of colorants which are useful in various applications.

The dispersant according to the present invention can be produced by a process disclosed, for example, in JP 46-33232 B, JP 46-33233 B or JP 46-34518 B or by a similar process.

For example, the dispersant represented by the formula (I) can be obtained by reacting 1 mole of a substituted or unsubstituted 1-aminoanthraquinone, 1 mole of one of a substituted or unsubstituted aniline, a substituted or unsubstituted phenol or a substituted or unsubstituted 1-aminoanthraquinone, and 1 mole of cyanuric chloride at 130° C. to 170° C. for 2 to 6 hours in an inert solvent such as o-dichlorobenzene and further reacting 1 mole of an aliphatic or aromatic amine, which contains one sulfonic acid group per molecule, at 150° C. to 170° C. for 3 to 4 hours.

The dispersant presented by the formula (II), on the other hand, can be obtained by reacting 2 moles of a substituted or unsubstituted 1-aminoanthraquinone and 1 mole of cyanuric chloride at 130° to 170° C. for 2 to 6 hours in an inert solvent such as o-dichlorobenzene, further reacting 1 mole of an aromatic amine, which does not contain any sulfonic acid group, at 150° C. to 170° C. for 3 to 4 hours, and then sulfonating the reaction product with a sulfonating agent such as fuming sulfuric acid.

Examples of the aliphatic amine or aromatic amine, which contains one sulfonic acid group per molecule and is useful for the production of the compound of the formula (I), can include taurine, N-methyltaurine, o-aminobenzenesulfonic acid, m-aminobenzenesulfonic acid, sulfanilic acid, 4-chloroaniline-3-sulfonic acid, 2-nitroaniline-4-sulfonic acid, 2-aminophenol-4-sulfonic acid, o-anisidine-5-sulfonic acid, p-anisidine-5-sulfonic acid, o-toluidine-4-sulfonic acid, m-toluidine-4-sulfonic acid, p-toluidine-2-sulfonic acid, 2-chloro-p-toluidine-3-sulfonic acid, 3-amino-6-chloro-4-sulfobenzoic acid, 1-amino-8-naphthalenesulfonic acid, 2-amino-1-naphthalenesulfonic acid, 5-amino-1-naphthalenesulfonic acid, 6-amino-1-naphthalenesulfonic acid and 5-amino-3-naphthalenesulfonic acid.

Examples of the aromatic amine useful for the production of the compound of the formula (II) can include aniline, N-methylaniline, toluidine (o-, m- or p-), anisidine (o-, m- or p-), chloroaniline (o-, m- or p-), diphenylamine, 1-naphthylamine and 2-naphthylamine.

Illustrative of the metal, which may form the metal salt with the compound represented by the formula (I) or (II), are alkali metals such as Li, Na and K; and multivalent metals such as Ca, Ba, Al, Mn, Sr, Mg and Ni. Illustrative of the amine, which may form the amine salt with the compound represented by the formula (I) or (II), are (mono, di or tri)alkylamines, substituted or unsubstituted alkylenediamines, alkanolamines, and alkylammonium chlorides.

Concerning the mixing ratio of the dispersant of the present invention to the pigment, the dispersant may be added in a proportion of from 0.05 to 40 parts by weight, preferably from 0.1 to 10 parts by weight per 100 parts by weight of the pigment. If the dispersant is added in an unduly low proportion, the intended effect of the dispersant cannot be fully brought about. Even if the dispersant is added in an excessively high proportion, the effect of the dispersant cannot be obtained so much as its proportion. On the contrary, use of the resulting pigment composition leads to paints or inks with reductions in the physical properties of their vehicles, and due to the color of the dispersant itself, the hues of the dispersed pigments are substantially modified.

Examples of pigments, the dispersion of which can be effectively achieved by the use of the dispersant of the present invention, can include organic pigments such as azo pigments, phthalocyanine pigments, quinacridone pigments, anthraquinone pigments, dianthraquinonyl pigments, isoindolinone pigments, perylene/perionone pigments, dioxazine pigments, indanthrone pigments, flavanthrone pigments, anthanthrone pigments, pyranthrone pigments, diketopyrrolopyrrole pigments, vat-dye pigments and basic-dye pigments; and inorganic pigments such as titanium oxide, carbon black, Prussian blue, ultramarine, red iron oxide, iron black, zinc white, chrome yellow and composite oxide pigments. Among these, particularly preferred are C.I. Pigment Red 245, C.I. Pigment Red 254, C.I. Pigment Red 177 and C.I. Pigment Green 36.

No particular limitation is imposed as to how the dispersant of the present invention is used. For example, the following methods can be mentioned:

1. The pigment and dispersant are mixed together beforehand by a known method, and the resulting pigment composition is added to a vehicle or the like to disperse the pigment in the vehicle or the like.

2. Upon dispersing the pigment in the vehicle or the like, the pigment and dispersant are separately added in predetermined proportions to a vehicle or the like to disperse the pigment and dispersant in the vehicle or the like.

3. After the pigment and dispersant are separately dispersed in portions of a vehicle or the like, the resulting dispersions are mixed together in predetermined proportions.

4. To a dispersion obtained by dispersing the pigment in a vehicle or the like, the dispersant is added in a predetermined proportion to disperse the pigment.

Whichever method is used, the intended pigment dispersing effect can be obtained. However, the method 1 or 2 is desired for more effective dispersion.

The pigment composition which contains the dispersant according to the present invention can be produced by mixing the pigment and the dispersant together in accordance with one of various methods known to date, and no particular limitation is imposed on its production method. Illustrative production methods can include: to mix powder of the pigment and powder of the dispersant without using any disperser; to mechanically mix the pigment and dispersant in one of various dispersers, such as a kneader, roll, or attritor; to add and mix a solution, in which the dispersant according to the present invention has been dissolved or finely dispersed, to and with a suspension of the pigment in water or an organic solvent such that the dispersant is allowed to uniformly deposit on surfaces of the pigment; and to dissolve the pigment and dispersant in a solvent having strong dissolving power such as sulfuric acid, and then to have both of the pigment and dispersant coprecipitated with a poor solvent such as water.

As is appreciated from the foregoing, the dispersant may be used in any one of solution, slurry, paste and powder forms upon preparation of the pigment composition. Whichever form the dispersant is used in, the effects of the present invention can be brought about.

Further, the dispersants according to the present invention can be used either singly or in combination and moreover, can be used in combination with one or more of conventionally known dispersants, for example, rosin, high molecular dispersants, surfactants, and pigment derivatives with polar groups introduced therein.

No particular limitation is imposed on the application of the pigment composition according to the present invention. For example, the pigment composition according to the present invention can be used as a colorant in various applications such as printing inks (offset inks, gravure inks and the like), various paints, plastics, pigment-type textile printing agents, dry or wet toners for electrophotography, inks for ink-jet recording, inks for thermal transfer recording, inks for writing instruments, and colorants for color filters. The pigment composition according to the present invention is particularly useful as a colorant for color filters in each of which a pigment is required to be dispersed to high degree.

In general, a colorant for color filters is produced by dispersing a pigment to high degree, for example, in a varnish of a photosensitive resin, such as a photosensitive polyacrylate resin, photosensitive polyamide resin, photosensitive polyimide resin or unsaturated polyester resin, or in a varnish obtained by adding a monomer as a reactive diluent to the varnish of the photosensitive resin. Use of the dispersant or pigment composition according to the present invention upon production of the colorant makes it possible to provide the colorant for color filters with high dispersion stability and high transmittance. For example, JP 10-338832 A discloses use of a pigment as a colorant for color filters by adding a pigment derivative and a cationic high molecular dispersant to the pigment. Use of the dispersant according to the present invention in place of the pigment derivative makes it possible to produce a colorant for color filters, said colorant featuring high dispersion stability of the pigment and also high transmittance.

The present invention will next be described more specifically based on Synthesis Examples, Examples and Comparative Examples, in which all designations of "part", "parts" and "%" are on a weight basis.

Synthesis Example 1

1-Aminoanthraquinone (72 parts) and cyanuric chloride (30 parts) were added to nitrobenzene (1,000 parts), followed by stirring at 170° C. for 5 hours. After the reaction mixture was allowed to cool down, taurine (41 parts) and potassium carbonate (23 parts) were added further, and the resulting mixture was then stirred at 180° C. for 8 hours. The reaction mixture was allowed to cool down and then filtered. Solid matter was washed with ethyl alcohol, then washed with water and thereafter, dried, whereby the following dispersant (A) (94 parts) was obtained.

Pigment dispersant (A)

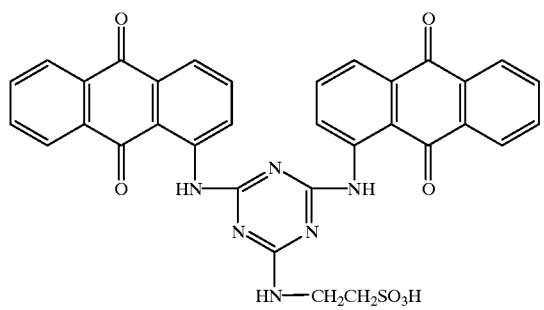

Synthesis Example 2

1-Aminoanthraquinone (72 parts) and cyanuric chloride (30 parts) were added to nitrobenzene (1,000 parts), followed by stirring at 170° C. for 5 hours. After the reaction mixture was allowed to cool down, sulfanilic acid (56 parts) and potassium carbonate (23 parts) were added further, and the resulting mixture was then stirred at 180° C. for 12 hours. The reaction mixture was allowed to cool down and then filtered. Solid matter was washed with ethyl alcohol, then washed with water and thereafter, dried, whereby the following dispersant (B) (101 parts) was obtained.

Pigment dispersant (B)

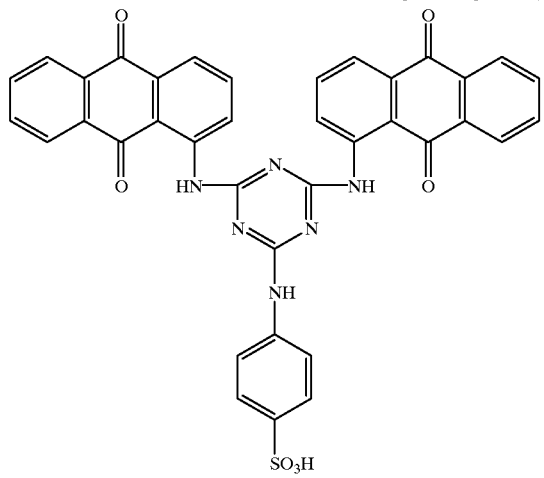

Synthesis Example 3

1-Aminoanthraquinone (73 parts) and cyanuric chloride (30 parts) were added to o-dichlorobenzene (1,100 parts), followed by stirring at 170° C. for 5 hours. After the reaction mixture was allowed to cool down, o-toluidine (35 parts) was added further, and the resulting mixture was then stirred at 180° C. for 5 hours. The reaction mixture was allowed to cool down and then filtered. Solid matter was washed with ethyl alcohol, then washed with water and thereafter, dried, whereby 2,4-bis(1-anthraquinonylamino)-6-tolylamino-1,3,5-triazine (94 parts) was obtained. That compound (94 parts) was then added to 5% fuming sulfuric acid (800 parts) at 10° C. or lower, followed by a reaction at 30° C. for 5 hours. The reaction mixture was allowed to cool down and was then caused to precipitate in iced water (2,500 parts). The filtrate was collected by filtration and was then washed with water, whereby the following dispersant (C) (102 parts) was obtained. As a result of an elemental analysis on sulfur, it was confirmed that on average, 0.9 sulfonic acid group had been introduced per molecule in the dispersant (C).

Pigment dispersant (C)

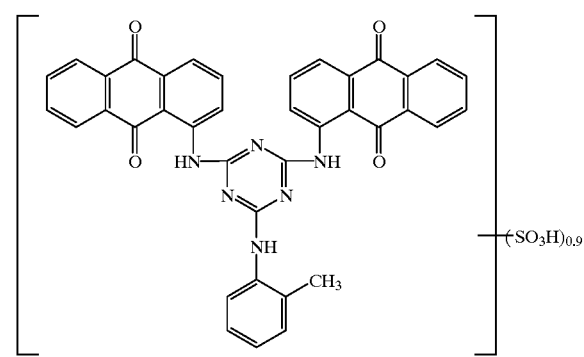

EXAMPLES 1 & 2

To rank effects of dispersants according to the present invention, gravure inks of the following formula (1) were prepared.

| Formula (1) | |
|---|---|
| Pigment | 9.5 parts |
| Dispersant (B) or (C) | 0.5 parts |
| Nitrocellulose varnish | 16.0 parts |
| Polyamide varnish | 20.0 parts |
| Thinner | 54.0 parts |

Using C.I. Pigment Red 146, a naphthol AS monoazo pigment, as a pigment and also using the dispersant (B) (Example 1) or the dispersant (C) (Example 2) obtained in Synthesis Example 2 or 3, the above-described components were placed in a container and subsequent to addition of glass beads, were dispersed by a paint conditioner. In this manner, two kinds of polyamide gravure inks were prepared.

Comparative Example 1

Dispersant-free polyamide gravure inks were prepared by repeating the procedures of Examples 1 and 2 likewise except that the dispersant was not used and C.I. Pigment Red 146 was used in a proportion of 10.0 parts.

The viscosities of the polyamide gravure inks of Examples 1 and 2 and the glosses of colored surfaces coated with the inks, respectively, were compared with those of the inks of Comparative Example 1. The viscosities of the individual inks and the glosses of the colored surfaces coated with the individual inks were measured by the below-described methods to rank the polyamide gravure inks of Examples 1 and 2 relative to the inks of Comparative Example 1.

Viscosity

Using a Brookfield type viscometer, the viscosities of the inks were measured at room temperature (25° C.) and 30 rpm.

Gloss

Using a bar coater (wire diameter: 0.15 mm), the inks were coated on polypropylene films, respectively. The glosses of the colored surfaces were compared visually and by a glossmeter. A high gloss was ranked "good". Glosses are indicated by the following ranking signs:

A: Good
B: Fair
C: Bad

The results of the above measurements are shown in Table 1.

EXAMPLE 3
(Preparation of Pigment Composition 1)

C.I. Pigment Red 146 (19.0 parts) was added to and dispersed in water (1,000 parts), whereby a slurry was formed. Added to the slurry was another slurry which had been prepared by dispersing the dispersant (A) (1.0 part) obtained in Synthesis Example 1 and caustic soda (0.1 part) in water (50 parts). The thus-mixed slurry was heated to 70° C., and its pH was adjusted to 4 to 5. After stirred for 20 minutes, the slurry was filtered to collect solid matter. The solid matter was dried and then ground, whereby a pigment composition (1) (19.9 parts) according to the present invention was obtained.

A polyamide gravure ink (1) was prepared in a similar manner as in Example 1 except that the pigment and dispersant in the formula (1) for Examples 1 and 2 were replaced in their entirety by the above-described pigment composition (1) (10.0 parts)

EXAMPLES 4 & 5
(Preparation of Pigment Compositions 2 & 3)

Procedures of Example 3 were repeated likewise except that the dispersants (B) and (C) obtained in Synthesis Examples 2 and 3 were used, respectively, in place of the dispersant (A), whereby pigment compositions (2) and (3) were obtained.

Polyamide gravure inks (2) and (3) were prepared in a similar manner as in Examples 1 and 2 except that the pigment and dispersant in the formula (1) for Examples 1 and 2 were replaced in their entirety by the above-described pigment compositions (2) and (3) (10.0 parts), respectively.

With respect to those inks (1) to (3), the viscosities of the inks and the glosses of colored surfaces coated with the inks were compared with those of the ink of Comparative Example 1. The results are shown in Table 1.

TABLE 1

Results of Ranking in Gloss and Viscosity of Polyamide Gravure Inks

| | | | Viscosity (mPa · sec) | | |
|---|---|---|---|---|---|
| Pigment | Example/ Comp. Ex. | Pigment dispersant | On the day of preparation | Seven days later | Gloss |
| C.I. Pigment Red 146 | Comp. Ex. 1 | — | 920 | 1580 | C |
| Same as above | Example 3 | A | 443 | 466 | A |
| Same as above | Example 1 | B | 270 | 321 | A |
| Same as above | Example 4 | B | 281 | 313 | A |
| Same as above | Example 2 | C | 135 | 159 | A |
| Same as above | Example 5 | C | 142 | 155 | A |

As is shown in Table 1, excellent pigment dispersing effects were observed in the inks (1) to (3) added with the dispersants (A) to (C) of the present invention. When the viscosities of those inks (1) to (3) were measured even after allowing them to stand for 1 week, no substantial increase was observed in viscosity as opposed to the ink of Comparative Example 1. With respect to each of the dispersants (A) to (C) of the present invention, the pigment and the dispersant were separately added to and mixed with the vehicle to disperse them in the vehicle. The effects of the dispersant were also obtained sufficiently as in the case where the pigment and the dispersant were added as the pigment composition.

EXAMPLES 6 & 7
(Preparation of Pigment Compositions 4 & 5)

Pigment compositions (4) and (5) were obtained by repeating the procedures of Example 3 likewise except that C.I. Pigment Red 245, a diketopyrrolopyrrole pigment, was used instead of C.I. Pigment Red 146 and the dispersants (B) and (C) were used, respectively.

EXAMPLES 8 & 9

(Preparation of Pigment Compositions 6 & 7)

Pigment compositions (6) and (7) were obtained by repeating the procedures of Example 3 likewise except that C.I. Pigment Green 36, a copper phthalocyanine green pigment, was used instead of C.I. Pigment Red 146 and the dispersants (B) and (C) were used, respectively.

To rank effects of the dispersants (B) and (C), urethane gravure inks of the following formula (2) were prepared by using the above pigment compositions (4) to (7), respectively.

| Formula (2) | |
|---|---|
| Pigment composition (4), (5), (6) or (7) | 10.0 parts |
| Nitrocellulose varnish | 5.0 parts |
| Polyurethane varnish | 35.0 parts |
| Thinner | 50.0 parts |

The above components were placed in a container and subsequent to addition of steel balls, were dispersed by a paint conditioner. In this manner, urethane gravure inks (4) to (7) were prepared.

Comparative Examples 2 & 3

Two kinds of dispersant-free urethane gravure inks were prepared in a similar manner as in Examples 6 and 8 except that C.I. Pigment Red 254 (Comparative Example 2) and C.I. Pigment Green 36 (Comparative Example 3) were used in place of the pigment compositions (4) and (6), respectively.

The viscosities of the inks of Examples 6–9 and the glosses of colored surfaces coated with the inks, respectively, were compared with those of the inks of Comparative Examples 2 and 3. The glosses of the colored surfaces and the viscosities of the inks were measured as in the case of the above-described polyamide gravure inks to rank the inks of Examples 6–9 relative to the inks of Comparative Examples 2 and 3. The results are shown in Table 2.

EXAMPLES 10–12

(Preparation of Pigment Compositions 8–10)

Pigment compositions (8) to (10) were obtained by repeating the procedures of Example 3 likewise except that C.I. Pigment Red 177 was used instead of C.I. Pigment Red 146 and the dispersants (A), (B) and (C) were used as dispersants, respectively.

To rank effects of the dispersants (A), (B) and (C), paints of the following formula (3) were prepared by using those pigment compositions (8) to (10), respectively.

| Formula (3) | |
|---|---|
| Pigment composition (8), (9) or (10) | 6.0 parts |
| Acrylic varnish | 46.6 parts |
| Melamine varnish | 20.0 parts |
| Thinner | 30.0 parts |

The above components were placed in a container and subsequent to addition of glass beads, were dispersed by a paint conditioner. In this manner, the paints were prepared.

Comparative Example 4

A dispersant-free paint was prepared by repeating the procedures of Example 10 likewise except that in place of 10.0 parts of the pigment composition (8), C.I. Pigment Red 177 was used in a proportion of 10.0 parts.

The viscosities of the paints of Examples 10 to 12 and the glosses of colored surfaces, which had been obtained after performing coating with the paints and baking the coated paints, respectively, were compared with those of the paint of Comparative Example 4. The viscosities of the individual paints and the glosses of the colored surfaces coated with the individual paints were measured by the below-described methods to rank the paints of Examples 10 to 12 relative to the paint of Comparative Example 4.

Viscosity

Using a Brookfield type viscometer, the viscosities of the paints were measured at room temperature (25° C.) and 30 rpm.

TABLE 2

Results of Ranking in Gloss and Viscosity of Urethane Gravure Inks

| | | | Viscosity (mPa · sec) | | |
|---|---|---|---|---|---|
| Pigment | Example/ Comp. Ex. | Pigment dispersant | On the day of preparation | Seven days later | Gloss |
| C.I. Pigment Red 254 | Comp. Ex. 2 | — | 874 | 1000 | C |
| Same as above | Example 6 | B | 152 | 177 | A |
| Same as above | Example 7 | C | 71 | 82 | A |
| C.I. Pigment Green 36 | Comp. Ex. 3 | — | 425 | 729 | A |
| Same as above | Example 8 | B | 90 | 95 | A |
| Same as above | Example 9 | C | 92 | 103 | A |

As is shown in Table 2, dispersing effects were also observed in the inks added with any one of the dispersants (B) and (C) of the present invention as in the case of the polyamide gravure inks although there were slight differences. When the viscosities of the inks of Examples 6–9 were measured even after allowing them to stand for 1 week, no substantial increase was observed in viscosity as opposed to the inks of Comparative Examples 2 and 3.

Gloss

Using an applicator (6 mil), the paints were coated on sheets of art paper, respectively, and were then baked. The glosses of the colored surfaces were compared visually and by a glossmeter. A high gloss was ranked "good". Glosses are indicated by the following ranking signs:

A: Good

B: Fair

C: Bad

The results of the above measurements are shown in Table 3.

TABLE 3

Results of Ranking in Gloss and Viscosity of Paints

| Pigment | Example/ Comp. Ex. | Pigment dispersant | Viscosity (mPa · sec) On the day of preparation | Seven days later | Gloss |
|---|---|---|---|---|---|
| C.I. Pigment Red 177 | Comp. Ex. 4 | — | 918 | 1220 | C |
| Same as above | Example 10 | A | 520 | 593 | B |
| Same as above | Example 11 | B | 514 | 574 | A |
| Same as above | Example 12 | C | 506 | 553 | A |

As is shown in Table 3, the effects of the dispersants (A) to (C) of the present invention were observed like the above-described results. Tinted paints were prepared by diluting the paints of Examples 10 to 12 to a concentration of one tenth with a white paint, which had been prepared using titanium oxide, respectively. The tinted paints were observed for possible flocculation of the pigment. However, flooding, settling or the like of the pigment was not observed.

EXAMPLES 13 & 14

To rank effects of the dispersants (B) and (C), color filter colorants of the following formula (4) were prepared by using the pigment compositions (9) and (10), respectively.

| Formula (4) | |
|---|---|
| Pigment composition (9) or (10) | 20.0 parts |
| Polyacrylic acid resin | 30.0 parts |
| Thinner | 50.0 parts |

The above components were placed in a container and subsequent to addition of zirconia beads, were dispersed by a paint conditioner. In this manner, the color filter colorants were prepared.

Comparative Example 5

A dispersant-free colorant for color filters was prepared by repeating the procedures of Example 13 likewise except that in place of 10.0 parts of the pigment composition (9), C.I. Pigment Red 177 was used in a proportion of 10.0 parts.

The flow properties of the color filter colorants of Examples 13 and 14 and the glosses of colored surfaces coated with the colorants, respectively, were compared with those of the color filter colorant of Comparative Example 4.

The flow properties of the individual colorants and the glosses of the colored surfaces coated with the individual colorants were measured by the below-described methods to rank the color filter colorants of Examples 13 and 14 relative to the colorant of Comparative Example 4.

Flow property

Using a Brookfield type viscometer, the flow property of each of the color filter colorants was measured at room temperature (25° C.) and 30 rpm.

Gloss

Using a bar coater (wire diameter: 0.45 mm), the color filter colorants were coated on polypropylene films, respectively. The glosses of the colored surfaces were compared visually and by a glossmeter. A high gloss was ranked "good". Glosses are indicated by the following ranking signs:

A: Good

B: Fair

C: Bad

The results of the above measurements are shown in Table 4.

TABLE 4

Results of Ranking of Color Filter Colorants

| Pigment | Example/ Comp. Ex. | Pigment dispersant | Viscosity (mPa · sec) On the day of preparation | Seven days later | Gloss |
|---|---|---|---|---|---|
| C.I. Pigment Red 177 | Comp. Ex. 5 | — | >2000 | >2000 | C |
| Same as above | Example 13 | B | 43 | 59 | A |
| Same as above | Example 14 | C | 38 | 49 | A |

As is shown in Table 4, the colorants making use of the dispersants (B) and (C) of the present invention, respectively, showed higher flow characteristics than the colorant of Comparative Example 5. Effects of the dispersants (B) and (C) of the present invention were thus confirmed.

Further, pigments to which dispersants of the present invention had been added were used for the coloration of printing inks such as offset inks, various paints such as nitrocellulose lacquer and melamine alkyd paints, and synthetic resins such as vinyl chloride resin. In all of those applications, the pigments did not undergo flocculation and showed good dispersion properties. In addition, the dispersants of the present invention were also used for the production of dry and wet toners for electrophotography, ink-jet recording inks, heat transfer recording inks, inks for writing instruments, and the like, all of which recently require a high level of dispersion. In those applications, excellent dispersion was observed owing to the effects of the dispersants according to the present invention.

What is claimed is:

1. A pigment dispersant comprising a compound represented by the following formula (I) or (II) or a metal, ammonium or amine salt thereof:

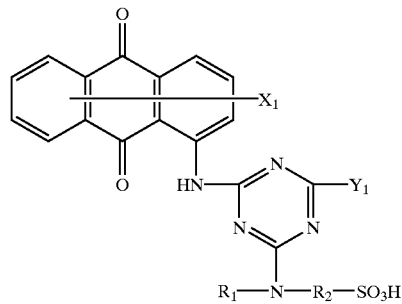

wherein $X_1$ is a hydrogen atom, a halogen atom, or an alkyl or acylamino group which may be unsubstituted or substituted by at least one atom or group selected from the group consisting of halogen atoms, alkyl groups and an acylamino group, $Y_1$ is an anthraquinonylamino, phenylamino, naphthylamino or phenoxy group which may be unsubstituted or substituted by at least one atom or group selected from the group consisting of halogen atoms, alkyl groups and an acylamino group, $R_1$ is a hydrogen atom or a substituted or unsubstituted alkyl or phenyl group, and $R_2$ is a substituted or unsubstituted alkylene, phenylene or naphthylene group; or

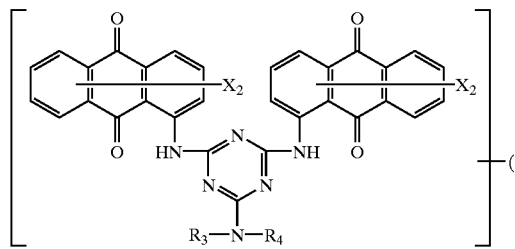

wherein $X_2$ is a hydrogen atom, a halogen atom, or a substituted or unsubstituted alkyl group, $R_3$ is a hydrogen atom or a substituted or unsubstituted alkyl or phenyl group, $R_4$ is a substituted or unsubstituted phenyl or naphthyl group, and n means an average number of sulfonic acid groups introduced in said compound and stands for a number of from 0.5 to 2.

2. A pigment dispersant according to claim 1, wherein $R_2$ in the formula (I) is a group obtained by removing an amino group from an amine selected from the group consisting of taurine, N-methyltaurine, o-aminobenzenesulfonic acid, m-aminobenzenesulfonic acid, sulfanilic acid, 4-chloroaniline-3-sulfonic acid, 2-nitroaniline-4-sulfonic acid, 2-aminophenol-4-sulfonic acid, o-anisidine-5-sulfonic acid, p-anisidine-5-sulfonic acid, o-toluidine-4-sulfonic acid, m-toluidine-4-sulfonic acid, p-toluidine-2-sulfonic acid, 2-chloro-p-toluidine-3-sulfonic acid, 3-amino-6-chloro-4-sulfobenzoic acid, 1-amino-8-naphthalenesulfonic acid, 2-amino-1-naphthalenesulfonic acid, 5-amino-1-naphthalenesulfonic acid, 6-amino-1-naphthalenesulfonic acid and 5-amino-3-naphthalenesulfonic acid.

3. A pigment dispersant according to claim 1, wherein $R_4$ in the formula (II) is a group obtained by removing an amino group from an amine selected from the group consisting of aniline, N-methylaniline, toluidine, anisidine, chloroaniline, diphenylamine, 1-naphthylamine and 2-naphthylamine.

4. A pigment composition comprising
 a pigment, and
 the pigment dispersant as defined in claim 1.

5. A pigment composition according to claim 4, wherein said pigment composition comprises 0.05 to 40 parts by weight of said pigment dispersant per 100 parts by weight of said pigment.

6. A pigment composition according to claim 4, wherein said pigment is a pigment selected from the group consisting of C.I. Pigment Red 245, C.I. Pigment Red 254, C.I. Pigment Red 177 and C.I. Pigment Green 36.

7. A gravure ink comprising the pigment composition as defined in claim 4.

8. A paint comprising the pigment composition as defined claim 4.

9. A color filter comprising the pigment composition as defined in claim 4.

10. A color filter comprising
 a photosensitive resin varnish, and
 the pigment composition as defined in claim 4 dispersed in said photosensitive resin varnish.

11. A method of using a pigment dispersant, the method comprising mixing a pigment with the pigment dispersant as defined in claim 1 to form a pigment composition.

12. A method according to claim 11, wherein said pigment composition comprises 0.05 to 40 parts by weight of said pigment dispersant per 100 parts by weight of said pigment.

13. A method according to claim 11, wherein said pigment is a pigment selected from the group consisting of C.I. Pigment Red 245, C.I. Pigment Red 254, C.I. Pigment Red 177 and C.I. Pigment Green 36.

14. A method according to claim 11, further comprising producing a gravure ink including said pigment composition.

15. A method according to claim 11, further comprising producing a paint including said pigment composition.

16. A method according to claim 11, further comprising producing a color filter including said pigment composition.

17. A method according to claim 11, further comprising
 dispersing said pigment composition in a photosensitive resin varnish to form a colorant, and
 producing a color filter including said colorant.

* * * * *